United States Patent [19]

Bones et al.

[11] Patent Number: 5,051,324
[45] Date of Patent: Sep. 24, 1991

[54] ELECTROCHEMICAL CELL

[75] Inventors: Roger J. Bones, Abingdon; James H. Duncan, Stafford; Ivor E. Denton, Wantage, all of England

[73] Assignee: Lilliwyte Societe Anonyme, Luxembourg, Luxembourg

[21] Appl. No.: 504,792

[22] Filed: Apr. 4, 1990

[30] Foreign Application Priority Data

Apr. 6, 1989 [GB] United Kingdom ............... 8907748

[51] Int. Cl.$^5$ .......................................... H01M 10/39
[52] U.S. Cl. ................................... 429/193; 429/104
[58] Field of Search .................... 429/193, 104, 30, 31

[56] References Cited

U.S. PATENT DOCUMENTS

| 3,932,195 | 1/1976 | Evans et al. | 429/193 |
| 4,226,923 | 10/1980 | Mikkor | 429/104 |
| 4,279,974 | 7/1981 | Nishio . | |
| 4,424,262 | 1/1984 | Alpen et al. | 429/104 |
| 4,568,502 | 2/1986 | Theodore et al. . | |
| 4,772,875 | 2/1988 | Wright . | |

FOREIGN PATENT DOCUMENTS 1274211 3/1969 United Kingdom .

OTHER PUBLICATIONS

"Plate-Type Beta" Alumina Electrolytes for an Advanced Sodium-Sulfur Cell Design, Pett et al., American Ceramic Society Bulletin, 64[4]:589–592 (1985).

"The Function and Performance of Beta Alumina in Sodium Sulfur Cells," Automotive Engineering Congress and Exposition, Detroit, Michigan, Feb. 24–28, 1975.

"Low Cost Fabrication of Thin-Walled Solid Electrolyte Tubes from Doctor-Bladed Ceramic Tape," Report prepared for U.S. Department of Energy, Contract No. EM-78-C-01-5161, Dirstine et al.

Primary Examiner—Donald L. Walton
Attorney, Agent, or Firm—Arnold, White & Durkee

[57] ABSTRACT

The invention provides a method of making a flattened solid electrolyte, e.g. $\beta$-alumina, envelope for use as an electrode holder in an electrochemical cell. A mouldable mixture of the $\beta$-alumina with a binder is formed into sheet material and two panels of the sheet material are joined together along their peripheral edges to form the envelope. Spacing and reinforcing means is provided between the panels to space them apart and to reinforce the envelope. The edges of the panels are joined together using pressure, heat and/or solvent, after which are envelope is heated to cure the binder, volatilize the cured binder and sinter the solid electrolyte.

12 Claims, 3 Drawing Sheets

ELECTROCHEMICAL CELL

This invention relates to a method of making a laterally flattened envelope of solid electrolyte suitable for use as an electrode holder in a high temperature rechargeable electrochemical cell. The invention also relates to such holders, when made in accordance with the method; and to electrochemical cells incorporating electrodes contained in such holders.

According to the invention there is provided a method of making a laterally flattened envelope of solid electrolyte for use as a holder for an electrode in an electrochemical cell, the method comprising the steps of formulating a mouldable mixture comprising the solid electrolyte or a precursor thereof in particulate form together with a binder having thermoplastic properties and a binder having setting properties;

forming the mixture into sheet material;

forming the sheet material into a laterally flattened envelope having a pair of major faces formed from said sheet material, the major faces being joined to each other along a peripheral edge of the envelope;

placing spacing and reinforcing means between the major faces before they are joined to each other at the peripheral edge of the envelope, the spacing and reinforcing means being shaped and located to space the major faces apart and to reinforce the envelope against damage caused by forces exerted on said major faces tending to urge them towards each other, and to provide a hollow interior for the envelope;

treating the envelope to cure the setting binder or binders;

heating the cured envelope to volatilize the binder or binders; and sintering the envelope after the binder or binders have been volatilized to convert the envelope into a sintered refractory artefact.

It is in principle possible to use the envelope as a holder for a cathode. In this case the cathode may be e.g. of the type described in the applicant's U.S. Pat. No. 4,772,875, a particulate discharged cathode precursor mixture impregnated with electrolyte being charged into the envelope after it has been formed, and being converted into a cathode by subjecting a cell in which it is coupled as a cathode with a sodium anode to at least one charge cycle. However it is contemplated that the envelope will usually be employed as an anode holder, containing molten sodium anode material as described hereunder, the cathode being outside the envelope instead of inside it.

Usually the solid electrolyte will be a conductor of sodium ions, such as $\beta$-alumina. In this specification $\beta$-alumina includes $\beta''$-alumina and in fact $\beta''$-alumina will usually be employed for the method by virtue of its enhanced ability, compared with $\beta$-alumina, to conduct sodium ions.

It is preferred to employ $\beta$-alumina or preferably $\beta''$-alumina in the mixture with one or more binders having thermoplastic and setting properties to form the sheet material for the envelope. However, instead and as indicated above, a precursor of $\beta$- or $\beta''$-alumina may be used, being a powder mixture comprising a suitable oxide or hydroxide of aluminium, together with soda and lithia or magnesia [or precursors thereof] in suitable proportions which mixture as is known in the art to form $\beta$- or $\beta''$-alumina when sintered.

Suitable thermoplastic and thermosetting binders are known for the purpose of the present invention, and are described for example in British Patent 1 274 211. As mentioned in this British Patent, instead of using separate binders respectively with thermoplastic and thermosetting properties, i.e. a thermoplastic binder and a setting binder, a single binder may be used, provided that it displays the required thermoplastic and thermosetting properties.

Accordingly, a single binder may be used, having both thermoplastic and thermosetting properties, the binder being used together with a plasticizer and a solvent. Thus, polyvinylbutyral may be used as both a thermoplastic and thermosetting binder, together with a plasticizer such as dibutyl phthalate and a solvent such as methyl ethyl ketone, the solvent and plasticizer facilitating blending of the binder into the $\beta$-alumina powder to form a homogeneous mixture. If high energy mixing, as in a Banbury mixer, is employed, the plasticizer and solvent can in principle be omitted.

Forming the mixture into sheet material may also be as described in British Patent 1 274 211, e.g. by calendering, rolling or by a doctor blade technique. The sheet material may also be densified as described in British Patent 1 274 211, e.g. by roll-compacting or pressing.

Forming the sheet material into the laterally flattened envelope will typically be by arranging two sheets of the material of the same size and shape [e.g. rectangular] face-to-face in register, and pinching their edges together with sufficient force plastically to deform them into each other to form an integral join along said periphery between the sheets. The pinching may be with the sheets at an elevated temperature in the range 50°–150° C., e.g. 60° C., at which the binder exhibits a degree of thermoplastic softening. Instead or in addition, particularly when the pinching takes place towards the lower end of said temperature range, the method may include applying a solvent to the edges, between them where they are pinched together, prior to the pinching, to permit the use of a reduced pinching force; and if desired such solvent can indeed be used with pinching to seal the edges together at room temperature. This solvent will typically be the solvent used for the binder or binders.

For use of the envelope as an anode sodium holder the sheets are preferably formulated so that, after sintering, the sintered $\beta$-alumina of the sheets is as close to theoretically fully dense as possible. Thus, the solid electrolyte may be $\beta$- or $\beta''$-alumina, having an average particle size of at most 70$\mu$, more preferably 10–50$\mu$; and a maximum particle size of at most 100$\mu$, being preferably substantially monosized. Instead, any other suitable solid electrolyte, capable of conducting anode cations such as sodium cations may be used. Examples for conducting sodium cations, include nasicon and certain glasses which have sodium oxide and silicon oxide as their main components. Suitable glasses are disclosed in Japanese laid-open Patent Application No. 62-274566. These glasses can be used alone or in admixture with other solid electrolytes such as $\beta$- or $\beta''$-alumina.

According to a particular feature of the invention for use as an anode sodium holder the spacing and reinforcing means may be shaped and located to divide the interior of the envelope into a plurality of parallel elongated channels, which may lead into a common manifold to promote electronic conductivity throughout such molten sodium as is in use held in the envelope. Instead, for this purpose, the spacing and reinforcing means may be relatively porous and thin, so that it can be impregnated and indeed saturated with liquid sodium, to provide for electronic conductivity and optionally sodium migration through the spacing and reinforcing means [which may provide a plurality of partitions dividing the envelope interior into said channels] in a lateral direction from one channel to another.

Conveniently the spacing and reinforcing means is also of $\beta$-alumina. This can be made relatively porous by forming particulate $\beta$-alumina [e.g. a powder which has a relatively large particle size and is relatively monosized] into a mixture with a binder similar to that used for the outer sheets which provide said major faces of the envelope. This mixture can then be shaped into the spacing and reinforcing means in a green and plastic state, and then placed between the outer sheets, after which it can be cured, heated to devolatilize it and sintered together with the sheet material of said outer sheets. Provision of the required porosity can also be promoted by incorporating particles of e.g. carbon, cellulosic material or volatile organic material which can be burnt out during the subsequent devolatilizing and/or sintering steps. In other words, the method may include making the spacing and reinforcing means from a mouldable mixture comprising said solid electrolyte together with at least one binder which has both thermoplastic and setting properties, shaping the spacing and reinforcing means from said mixture and placing the spacing and reinforcing means in a green plastic state between the outer sheets, prior to the heating and sintering.

A particularly convenient method in accordance with the present invention contemplates the use of corrugated-cardboard derived technology in that a thin corrugated sheet, formed from a $\beta$-alumina mixture as described above which is formulated to be porous after sintering, is sandwiched between the two outer sheets, the corrugated sheet being of the same size and shape as the outer sheets so that its peripheral edge is pinched between the edges of the outer sheets during the pinching step. Typically, shaping the spacing and reinforcing means may be by rolling the mixture from which the shaping and reinforcing means is made between a pair of profiled rollers to provide the shaping and reinforcing means with the shape of a corrugated sheet. Thus, the corrugated sheet will be formed by rolling between two profiled rollers, e.g. to have sinusoidal corrugations therein of a suitable pitch and an amplitude equal to the intended spacing between the outer sheets. The outer sheets will thus be urged against the crests of the corrugations on opposite sides of the corrugated sheet during the forming of the envelope in its green state, and held in this position during the pinching.

A further means of corrugating the sheet is to sandwich it between two sheets of a thin metal foil, e.g. aluminium foil. This sandwich is then passed through the profiled rollers. All three layers are corrugated simultaneously. Using this method the corrugation can be carried out at room temperature. The aluminium supporting foils can be peeled off the corrugated plastic sheet when required.

The envelope may be provided with an electrode feedthrough. This may be done by wrapping sheet material of the type used for the outer sheets of the holder around a former to form a tubular opening or neck, bonding one end of the neck to said outer sheets by suitable pressure at a temperature at which the binder is plastic, and removing the former to leave a feedthrough into the hollow interior of the holder, the remainder of the periphery of the holder being sealed as described above by pinching. If desired, for use in an electrochemical cell, the neck or feedthrough may instead be made from a mixture in which the $\beta$-alumina of the outer sheets is replaced by $\alpha$-alumina of the same particle size. During sintering this will form an ionically and electronically insulating neck or feedthrough integrally bonded and sintered to the envelope. In other words, the method may include the step of providing a tubular opening into the interior of the envelope by forming, around a former, a tube of a mouldable sinterable mixture comprising particulate material and at least one binder which has both thermoplastic and setting properties, bonding one end of the neck to said outer sheets at a temperature at which the binder in both the tube and sheets is plastic, removing the former and heating and sintering the tube together with the sheets.

If desired for use as an anode sodium holder the envelope may be made with an enlarged portion at one edge thereof, e.g. at one end of the channels. Thus, forming the sheet material into a laterally flattened envelope may include forming an enlarged portion of the envelope at one edge thereof to provide a reservoir integral with the envelope. In this portion the outer sheets will be spaced further apart from each other than elsewhere and a corrugated panel of increased amplitude may be used for spacing and reinforcing. This construction is intended for use with the enlarged portion uppermost, to act as a sodium reservoir which can feed sodium downwardly under gravity into the envelope as it is consumed during the discharge of an electrochemical cell in which it is the anode material.

In this case the spaced edges of the outer sheets may be closed off by pinching as described above, or may be closed off by a flat panel of the abovedescribed dense $\beta$-alumina or $\alpha$-alumina mixtures. When they are pinched a green sodium feedthrough may be provided therein as described above; or a hole may be formed in the green panel and a separately formed sintered feedthrough can be glassed into the hole, after the envelope is sintered. Indeed, even feedthroughs made by pressing a green tube on a former may, after sintering, have the seal of the feedthrough to the envelope glassed.

While curing the binder may be achieved in any desired fashion, e.g. by irradiation or the use of a catalyst, heating of a thermosetting binder such as polyvinyl butyral as mentioned above to e.g. 100°–200° C. is convenient.

The heating to devolatilize the envelope may be according to any suitable heating regime, but care should be taken that the heating is sufficiently slow to drive off the volatiles without harming the integrity of the eventual envelope in any way.

Thus a typical heating regime may involve heating at a rate of at most 60° C./hr from ambient up to a curing temperature of say 200° C.; slower heating of a rate of at most 30° C./hr from the curing temperature up to a temperature of say 450° C. at which all the volatiles, including carbon, have been driven off; a relatively increased rate thereafter of at most 180° C./hr up to a temperature of say 10°–20° C. below the maximum temperature; and a final heating at a slower rate of at most 60° C./hr up to the maximum temperature. After a hold of e.g. 10–20 minutes at the maximum temperature for annealing, if desired, cooling may be at a maximum rate of at most 240° C./hr down to say 1000° C.; followed by cooling at an increased rate of at most 360° C. down to ambient temperature.

The invention extends also to a laterally flattened envelope of β-alumina for use as a holder for electrode material in an electrochemical cell, whenever made in accordance with the method described above.

The invention extends further to an electrochemical cell incorporating an electrode contained in an envelope as described above, the β-alumina of the envelope acting as a solid electrolyte whereby the electrode is coupled with a suitable electrode outside the holder.

Usually the electrode in the holder will be a molten sodium anode, being coupled with a suitable cathode or catholyte outside the holder, optionally via a liquid electrolyte.

The catholyte may be sulphur/sodium sulphide/polysulphide; and when the cell has a liquid electrolyte and cathode, they may be as described in British Patent 2 114 803.

The invention will now be described, by way of example with reference to the following specific Example and diagrammatic drawings in which.

Figure 1:
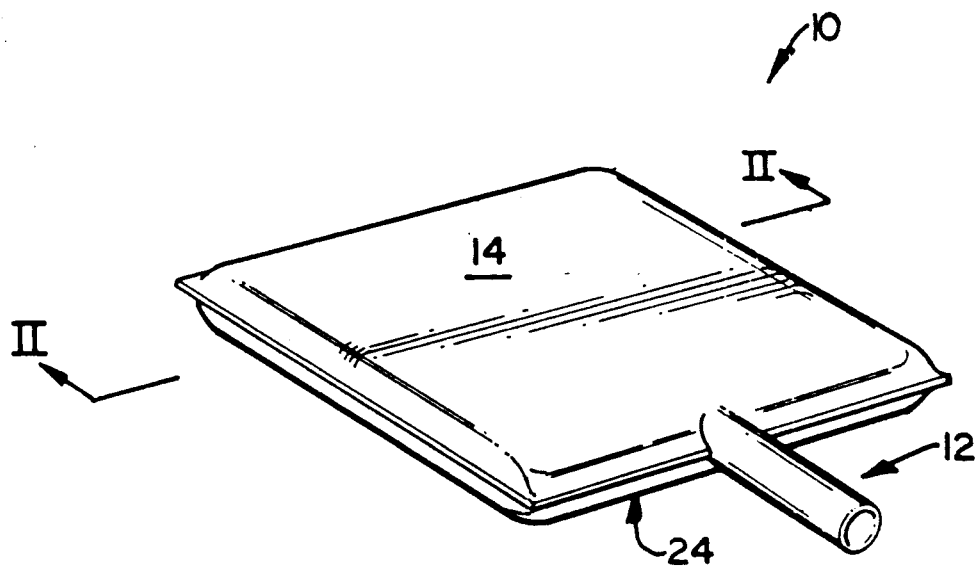
FIG. 1 shows a three-dimensional view of an anode envelope holder according to the present invention.
Figure 2:
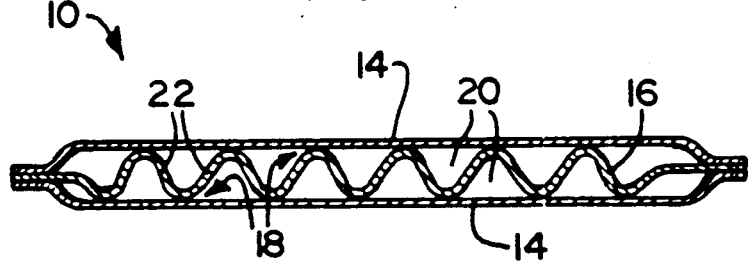
FIG. 2 shows a cross-section of the holder of FIG. 1, in the direction of line II—II in FIG. 1.

In FIGS. 1 and 2 reference numeral 10 generally designates a laterally flattened envelope of β-alumina in accordance with the invention. The envelope is rectangular in outline and has a tubular anode feedthrough 12 at one thereof, leading into its hollow interior through one edge thereof. The envelope 10 has two outer panels 14 of sintered full density β"-alumina which are spaced apart to define a hollow interior for the envelope. The panels are spaced apart by a sintered corrugated porous β-alumina panel 16 located between the panels 14 and having the crests of its corrugations in contact with and optionally sintered to the panles 14 at 18. The corrugations of the panel 16 divide the interior of the envelope 10 into a plurality of parallel channels 20 defined between the panel 16 and the panels 14 respectively. These channels 20 are separated from one another in series by a plurality of porous partitions 22 provided by the corrugations of the panel 16. The feedthrough 12 extends in the same direction as the channels 20, opening into an edge 24 of the envelope which closes off the ends of the channels 20.

Figure 3:
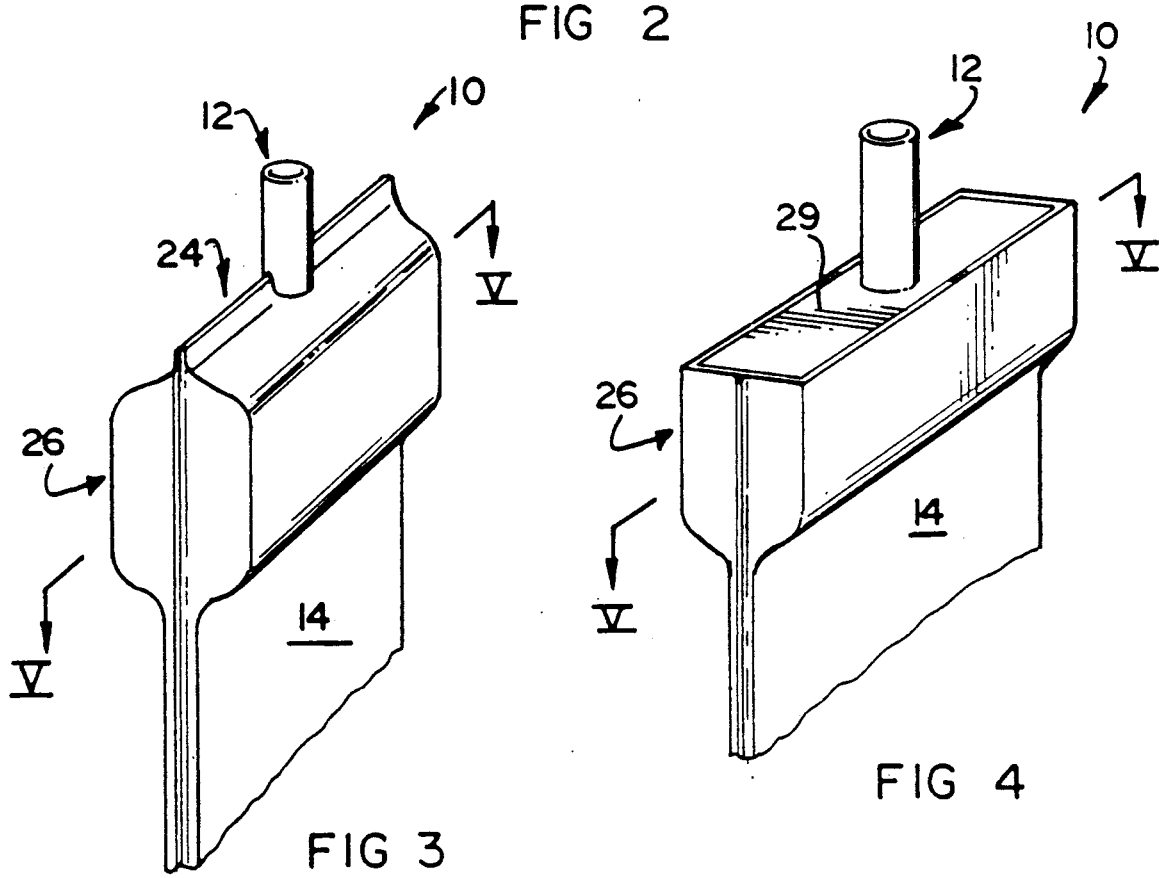
FIG. 3 shows a three dimensional view of part of another anode envelope according to the invention.
Figure 4:
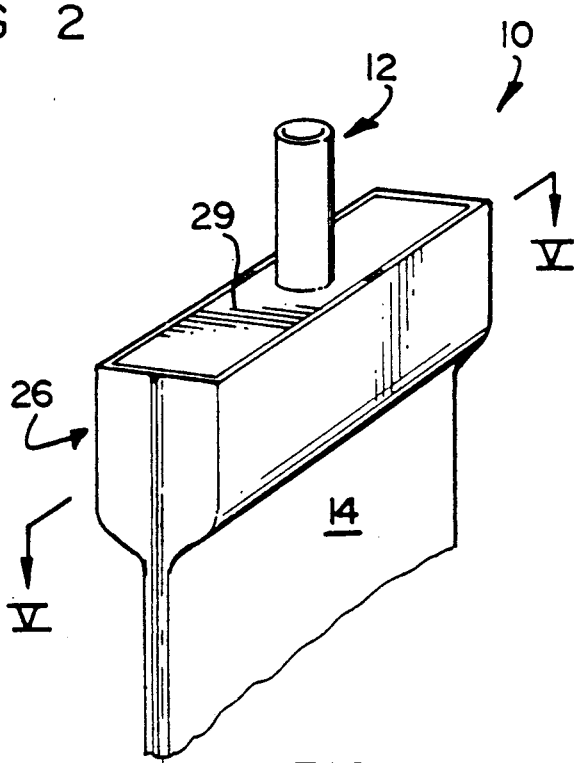
FIG. 4 shows a view similar to FIG. 3 of part of yet another anode envelope according to the invention.
Figure 5:
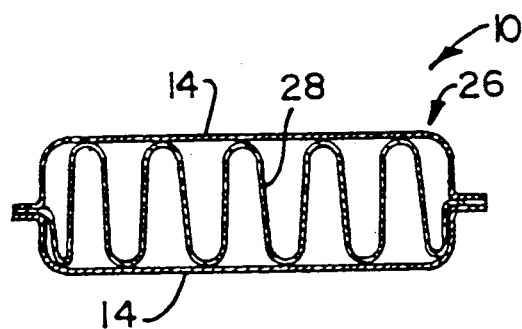
FIG. 5 shows a section, in the direction of the line V—V, in FIGS. 3 and 4.

FIGS. 3 and 4 show similar envelopes 10, and the same reference numberals refer to the same parts, unless otherwise specified, as in FIG. 1. The envelopes 10 of FIGS. 3 and 4 each have an enlarged portion 26 at one edge thereof, where the panels 14 are spaced further apart from each other than in the remainder thereof, which is similar to FIG. 1. In the enlarged portion 26 there is a corrugated panel 28 [see FIG. 5] having an increased pitch and amplitude of its corrugations relative to the pitch and amplitude of the corrugations of the corrugated panel [not shown but similar to panel 16 of FIGS. 1 and 2] which separates the panels 14 in the remainder of the envelope. In FIG. 3 the feedthrough 12 is similar to that of FIG. 1, but in FIG. 4 the edges of the panels 14 in the enlarged portion are closed off by a flat panel 29 having a preformed hole through which the feedthrough 12 passes The feedthrough 12 of FIGS. 1 to 5 may be of β"-alumina or α-alumina, sintered and/or glassed to the panels 14 of the envelope; and the panel 29 may correspondingly be of β"-alumina or α-alumina.

Figure 6:
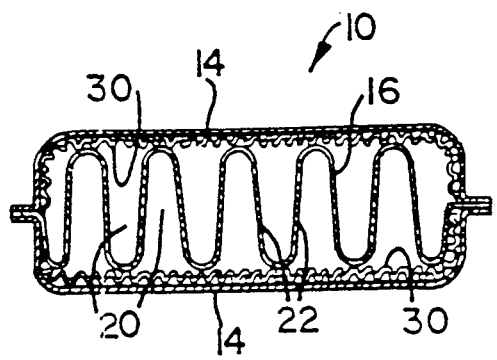
FIG. 6 shows a view similar to FIG. 2 of another construction for the holder of FIG. 1.

In FIG. 6 the same reference numerals are again used for the same parts as in FIG. 1, unless otherwise specified. The construction of the envelope 10 in FIG. 6 is broadly similar to that of FIG. 1 except that two additional panels 30 are provided, corrugated with corrugations of a substantially smaller pitch and amplitude than those of the panel 16. The panels 30 are of the same porous construction as the panel 16 and are sandwiched between the panel 16 and the panels 14 respectively. In use the panels 30 act as wicks for wicking liquid sodium over the inner surfaces of the panels 14.

If desired a suitable β- or β"-alumina powder may be charged into the spaces between the corrugations of the panels 30 and the panels 14, e.g. spray-dried powder, to act as an additional wicking material for wicking molten sodium over the inner surfaces of the panels 14.

Figure 7:
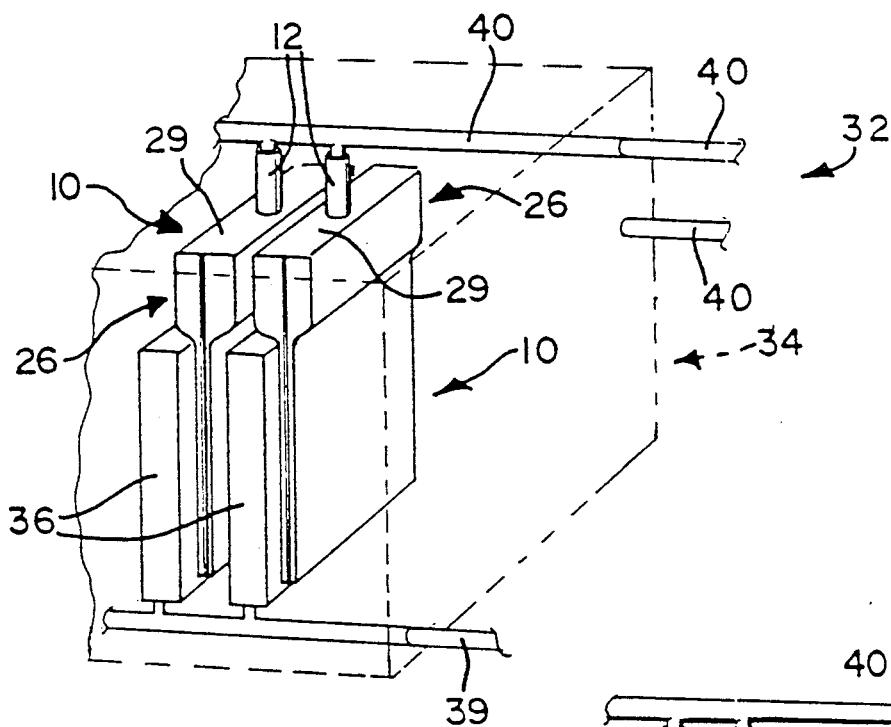
FIG. 7 shows a schematic three dimensional view of an selectrocnemical cell incorporating a plurality of anode envelopes according to FIG. 3.
Figure 8:
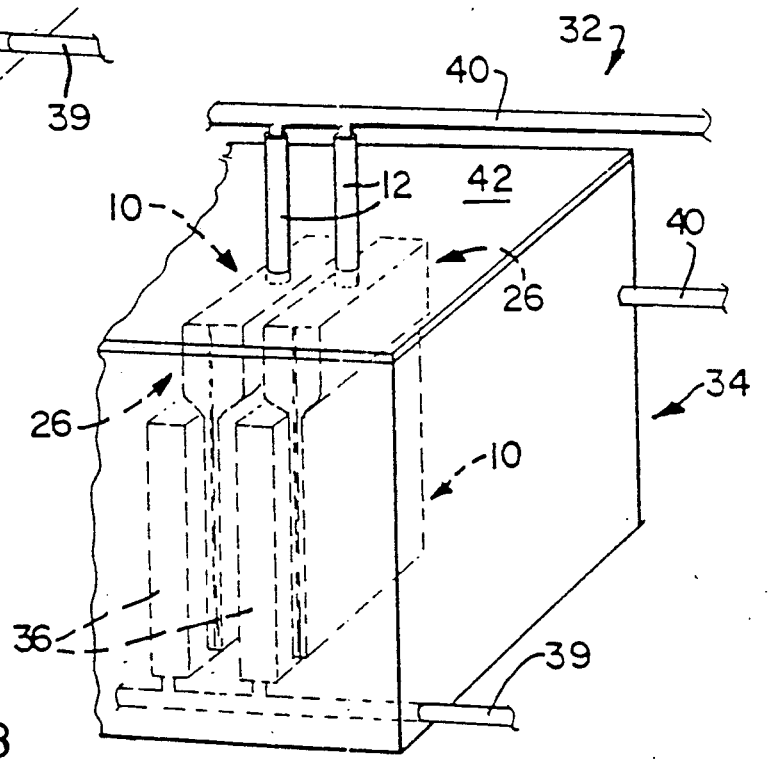
FIG. 8 shows a view similar to FIG. 7 of another cell according to the invention.

Turning to FIGS. 7 and 8, reference numeral 32 generally designates a high temperature rechargeable electrochemical cell in accordance with the present invention. The cell is shown having a box-like housing 34 made of flat α-alumina panels within which a plurality of flat plate cathode structures 36 are arranged in spaced parallel, face-to-face relationship. These cathodes are of the type described in British Patent 2 114 803c and are impregnated with and immersed in a molten salt liquid electrolyte [not shown] also of the type described in British Patent 2 114 803. These cathode structures 36 are connected in parallel to a common cathode cell terminal 39.

The cell 32 further comprises a plurality of anode structures, each in the form of an envelope 10 according to the present invention and containing molten sodium active anode material.

The envelopes are, in FIG. 7, of the type shown in FIG. 4, their enlarged portions 26 being uppermost and filled with sodium through their feedthroughs 12 to act as sodium reservoirs for feeding sodium downwardly under gravity, as it is consumed during discharge of the cell, into the narrow lower portions of the envelopes which are arranged in series between the cathode structures 36, face-to-face therewith and closely spaced therefrom. The level of electrolyte in the housing 34 is such that the cathode structures 36 are at all times immersed therein. The feedthroughs 12 of the envelopes 10 are all in communication with a common passage or manifold 40 which leads to an external vapour trap [not shown] and then into the freeboard of the housing 34, above the level of the electrolyte 38. The passage 40 is of steel and has steel branch pipes leading down via the feedthroughs 12 [to which feedthroughs said branch pipes are sealed] into the sodium in the enlarged portions 26, so that the passage 40 acts as a common anode terminal which connects the anode structures electrically in parallel.

In FIG. 8 the construction is generally similar to FIG. 7, but, instead of separate panels 29 closing the enlarged portions 16 of the envelopes 10, the envelopes 10 are closed off by the upper panel 42 of the housing 32, to which they are sealed. The passage or manifold 40 is thus external to and raised above the housing 32, unlike FIG. 7 in which it is inside the housing 32 except where it passes out to the vapour trap. In FIGS. 7 and 8 the function of the passage with its vapour trap is pressure equalization between the interiors of the envelopes 10 on the one hand and the interior of the housing 32, outside the envelopes 10 on the other hand. This pressure equalization if desirable to compensate for the fact that, with charging and discharging, sodium moves respectively into and out of the envelopes 10 through their outer panels 14, from and to the electrolyte 38. Without this pressure equalization a drop in pressure in the envelopes and an increase in pressure in the electrolyte 38, during discharging of the cell, can in particular stress the envelopes and damage them. It is for this reason, too, that the corrugated panels 16 are desirable, as they reinforce the envelopes against external pressure. They also retard free flow of sodium therein, in the event of cracking or fracture of the envelopes, which promotes safety.

It should be noted that in FIG. 7 the housing 34 is shown in broken lines, with the rest of the cell in the interior of the housing in solid lines, whereas in FIG. 8 the housing is shown in solid lines, with those parts of the cell inside the housing being shown in broken lines.

Figure 9:
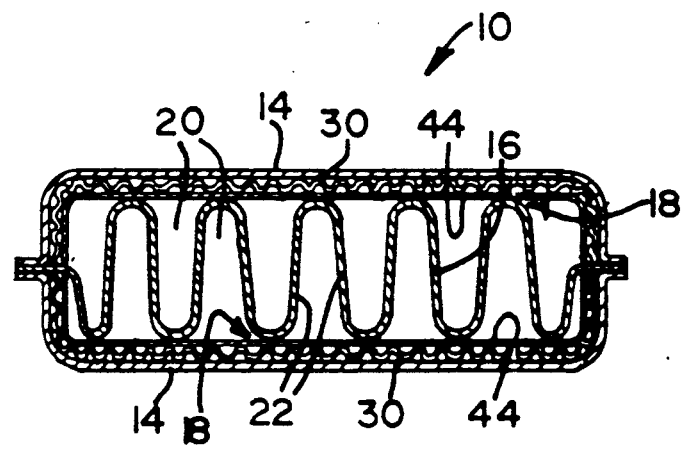
FIGS. 9 and 10 show details of holders, similar to FIG. 6, but with somewhat different constructions, FIG. 10 being shown enlarged.
Figure 10:
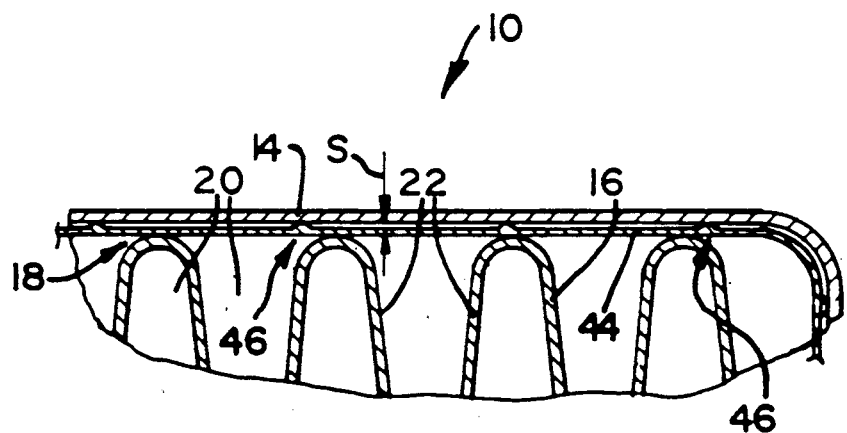

In FIGS. 9 and 10 the same reference numerals are used for the same parts as in FIG. 6, unless otherwise specified. In FIG. 9, two additional $\beta$-alumina sheets 44 are shown, respectively lining the panels 30, on the sides of the panels 30 opposite the panels 14. In FIG. 10, the panels 30 are omitted and the sheets 44 are retained, spaced by spacing 'S' from the panels 14 by boss-like spacers 46 provided at spaced positions spread out about 10 mm apart on the surface of the sheets 44 which face the panels 14.

In each case the crests of the corrugations of the panel 16 abut and may be sintered at 18 to the sheets 44. For the panels 30, the Applicant proposes for FIG. 9 $\beta$-alumina 0.2 mm thick, with corrugations of 1 mm pitch and 0.2 mm amplitude, with sheets 44 which are at most 0.2 mm thick and panels 14 which are 1 mm thick. In FIG. 10 the sheets 44 will be about 0.2 mm thick and will be spaced by spacing S about 0.2 mm from the panels 14. Otherwise, the corresponding dimensions in FIGS. 6, 9 and 10 are essentially similar to one another, the panels 16 having a pitch of about 8 mm and an amplitude of about 4,2 mm, with a nominal thickness of 0.2 mm.

EXAMPLE

By way of example, the Applicant proposes for use in the envelopes 10, a mixture for the sheets for making the outer panels 14, of the following composition:

| Constituent | |
|---|---|
| $\beta''$-alumina powder [10–50$\mu$ size] | 80–120 g |
| binder | 14–18 g |
| plasticizer | 5–10 g |

-continued

| Constituent | |
|---|---|
| solvent | 0–50 ml |

The binder, plasticizer and solvent will be of the type described in British Patent 1 274 211.

When mixed the constituents will form a semi-dry powder mixture. This will be fed through a hot rolling machine with multiple rollers at about 50°–150° C. (depending on the composition employed) at which temperature the binder will be plastic. The mixture will be rolled to a flat sheet of a thickness of about 0.6 mm and having a density after rolling, of about 2.1–2.3 g/cm³.

A further sheet made in similar fashion will be passed at 50°–70° C. between two corrugated rolls to impart corrugations thereto having a pitch of about 5 mm and an amplitude of about 2 mm. This corrugated sheet will then be passed together with one said flat sheet between a corrugated roll and a plain roll to adhere the two sheets together under heat and pressure. A further flat sheet will be attached to the opposite side of the corrugated sheet using said solvent and slight pressure. Further sheet material of similar composition will be wrapped around a former to form a feedthrough. The edges of the envelope will be sealed at 50°–70° C. using a small roller and hand pressure; and the feedthrough will be pinched and sealed at 50°–70° C. to the flat sheets at the ends of the corrugations before the former wa removed.

A free-standing green envelope will be obtained which will then be heated and fired according to the following regime:
ambient—450° C. at 10° C./hr
450°–1600° C. at 180° C./hr
1600°–1617° C. at 60° C./hr
1617° C.—hold for 15 minutes
1617°–1000° C. at 240° C./hr
1000° C.—ambient at 360° C./hr After use of this firing regime a continuous unitary sintered $\beta''$-alumina envelope will be obtained. It is expected to comprise about 98% by mass $\beta''$-alumina having a density of 3.1–3.2 g/cm³. The envelope is expected to exhibit a [linear] shrinkage of about 17–18% upon firing.

This Example demonstrates the feasibility of the method of the present invention for making $\beta''$-alumina envelopes of the type in question, of acceptable quality and density.

With regard to the more detailed construction of the envelopes 10, it is contemplated that the panels 14 will typically be about 1 mm thick. The panel 16 [FIG. 2] may in turn be about 0.2 mm thick, having corrugations with a pitch of 8 mm and an amplitude of about 4–4.5 mm; and the panels 30 [FIG. 6] may also be about 0.2 mm thick but with a pitch of about 1 mm and an amplitude of about 0.2 mm. Instead of having the panel 16 in contact with said panels 30 as shown in FIG. 6, a flat sheet of $\beta''$-alumina of at most 0.2 mm thickness may be interposed between them so that they bear against this flat sheet. Finally, instead of employing the panels 30 for wicking, flat panels [not shown] may be used in place of the panels 30. These flat panels will be located between the panel 16 and the panels 14, and may be 0.2 mm thick and spaced by a space of 0.2 mm from the panels 14, the spacing being effected by spacers formed on the flat panels at spaced positions about 10 mm apart on the faces of the flat panels which face the panels 14.

Other options include omitting the anode feedthrough 12, and having one end of the envelope 10 open at the ends of the corrugations, presenting an end view similar to the section shown in FIG. 2. The whole of this open end of the envelope could then be glassed or otherwise sealed into a slot of the same outline formed e.g. in an α-alumina bar or block. This bar or block could be hollow to form a sodium reservoir or could have a metal reservoir attached thereto in communication with the interior of the envelope, the reservoir having a sodium storage function similar to that of the enlarged portion 26 of FIGS. 3 and 4. It should also be noted that instead of a plurality of envelopes 10 in a cell housing 32 as shown in FIGS. 7 and 8, a simple cell can have a single envelope in a housing, the envelope being straddled by a pair of cathode structures 36, e.g. of half the thickness of the structures 36 shown in FIGS. 7 and 8.

Finally it should be noted that, although the primary reinforcing function of the corrugated panels is reinforcement against compressive forces on the envelope, when they are bonded to the outer panels 14, they can also reinforce the envelope against internal pressure in the envelope.

We claim:

1. A method of making a laterally flattened envelope of solid electrolyte for use as a holder for an electrode in an electrochemical cell, the method comprising the steps of formulating a mouldable mixture comprising the solid electrolyte or a precursor thereof in particulate form together with a binder having thermoplastic properties and a binder having setting properties;

forming the mixture into sheet material;

forming the sheet material into a laterally flattened envelope having a pair of major faces formed from said sheet material, the major faces being joined to each other along a peripheral edge of the envelope;

placing spacing and reinforcing means between the major faces before they are joined to each other at the peripheral edge of the envelope, the spacing and reinforcing means being shaped and located to space the major faces apart and to reinforce the envelope against damage caused by forces exerted on said major faces tending to urge them towards each other, and to provide a hollow interior for the envelope;

treating the envelope to cure the setting binder or binders;

heating the cured envelope to volatilize the binder or binders; and sintering the envelope after the binder or binders have been volatilized to convert the envelope into a sintered refractory artefact.

2. A method as claimed in claim 1, in which a single binder is used, having both thermoplastic and thermosetting properties, the binder being used together with a plasticiser and a solvent.

3. A method as claimed in claim 1, in which forming the sheet material into the laterally flattened envelope is by arranging two sheets of the material of the same size and shape face-to-face in register, and pinching their edges together with a sufficient force plastically to deform them into each other to form an integral join along said periphery between the sheets.

4. A method as claimed in claim 3, in which the pinching is carried out with the sheets at an elevated temperature in the range 50° C.–150° C. at which the binder exhibits a degree of thermoplastic softening.

5. A method as claimed in claim 3, which includes applying a solvent to the edges, between them where they are pinched together, prior to the pinching, to permit the use of a reduced pinching force.

6. A method as claimed in claim 1, in which the solid electrolyte is $\beta$- or $\beta''$-alumina, having an average particle size of at most 70μ, and a maximum particle size of at most 100μ.

7. A method as claimed in claim 1, in which the spacing and reinforcing means is shaped and located to divide the interior of the envelope into a plurality of parallel elongated channels.

8. A method as claimed in claim 7, which includes making the spacing and reinforcing means from a mouldable mixture comprising said solid electrolyte together with at least one binder which has both thermoplastic and setting properties, shaping the spacing and reinforcing means from said mixture and placing the spacing and reinforcing means in a green plastic state between the outer sheets, prior to the heating and sintering.

9. A method as claimed in claim 8, in which shaping the spacing and reinforcing means is by rolling the mixture from which the shaping and reinforcing means is made between a pair of profiled rollers to provide the shaping and reinforcing means with the shape of a corrugated sheet.

10. A method as claimed in claim 1, which includes the step of providing a tubular opening into the interior of the envelope by forming, around a former, a tube of a mouldable sinterable mixture comprising particulate material and at least one binder which has both thermoplastic and setting properties, bonding one end of the tube to said outer sheets at a temperature at which the binder in both the tube and sheets is plastic, removing the former and heating and sintering the tube together with the sheets.

11. A method as claimed in claim 1, in which forming the sheet material into a laterally flattened envelope includes forming an enlarged portion of the envelope at one edge thereof to provide a reservoir integral with the envelope.

12. A laterally flattened envelope of solid electrolyte for use as a holder for an electrode in an electrochemical cell, whenever made by the method of claim 1.

* * * * *

UNITED STATES PATENT AND TRADEMARK OFFICE
CERTIFICATE OF CORRECTION

PATENT NO. : 5,051,324
DATED : September 24, 1991
INVENTOR(S) : Roger J. Bones, et al It is certified that error appears in the above-identified patent and that said Letters Patent is hereby corrected as shown below:

In column 1, line 43, replace "4,772,875" with --4,722,875--.

In column 6, line 65, replace "the electrolyte 38" with --said electrolyte--.

In column 7, line 20, replace "the electrolyte 38" with --said electrolyte--.

In column 7, line 23, replace "the electrolyte 38" with --said electrolyte--.

Signed and Sealed this

Twenty-first Day of September, 1993

Attest:

BRUCE LEHMAN

Attesting Officer    Commissioner of Patents and Trademarks